United States Patent
Giles

(10) Patent No.: US 6,629,029 B1
(45) Date of Patent: Sep. 30, 2003

(54) MULTI-PURPOSE PLUG-IN MONITOR FOR VEHICLES

(76) Inventor: Jacqueline A Giles, 8231 O'Dowling Dr., Onsted, MI (US) 49265

( * ) Notice: Subject to any disclaimer, the term of this patent is extended or adjusted under 35 U.S.C. 154(b) by 0 days.

(21) Appl. No.: 09/820,286

(22) Filed: Mar. 28, 2001

Related U.S. Application Data

(60) Provisional application No. 60/193,157, filed on Mar. 28, 2000.

(51) Int. Cl.$^7$ .......................... G01M 17/00; G06F 19/00; G06F 7/00
(52) U.S. Cl. .......................... 701/35; 73/117.3; 702/185
(58) Field of Search .............................. 701/29, 36, 48, 701/49, 33, 114, 35; 370/245, 252; 709/251, 230; 73/432.1, 116, 117.2, 117.3; 702/183, 185

(56) References Cited

U.S. PATENT DOCUMENTS

| | | | | |
|---|---|---|---|---|
| 4,671,111 A | * | 6/1987 | Lemelson | 340/439 |
| 4,831,560 A | * | 5/1989 | Zaleski | 701/33 |
| 5,499,182 A | | 3/1996 | Ousborne | 364/424.04 |
| RE35,590 E | * | 8/1997 | Bezos et al. | 340/870.41 |
| 5,758,300 A | * | 5/1998 | Abe | 249/10 |
| 5,850,209 A | * | 12/1998 | Lemke et al. | 345/156 |
| 5,916,287 A | * | 6/1999 | Arjomand et al. | 701/29 |
| 5,922,037 A | * | 7/1999 | Potts | 701/29 |
| 2002/0004694 A1 | * | 1/2002 | McLeod et al. | 701/29 |
| 2002/0011937 A1 | * | 1/2002 | Tanenhaus et al. | 340/70.05 |

* cited by examiner

Primary Examiner—Thomas G. Black
Assistant Examiner—Ronnie Mancho
(74) Attorney, Agent, or Firm—James M. Deimen

(57) ABSTRACT

Modem passenger vehicles have many electronic control modules linked by a serial data bus. The control modules provide a large, continuous stream of driving and vehicle parameters which are available at a federally mandated data port located under the dashboard. With no other circuitry or sensors, the new electronic monitor is plugged into the data port to obtain real-time driving and vehicle data. This real-time data can be used to instruct and improve safety related driving behavior, improve fuel efficiency related driving behavior, aid in diagnosing vehicle problems, fleet use monitoring, and customized monitoring. The specific software programmed into the monitor is tailored to the specific desires of the vehicle owner, vehicle operator, vehicle driver or possible future governmental regulations. Also, with an optional key-fob like device, certain other software can be engaged or disengaged during use of the vehicle.

4 Claims, 3 Drawing Sheets

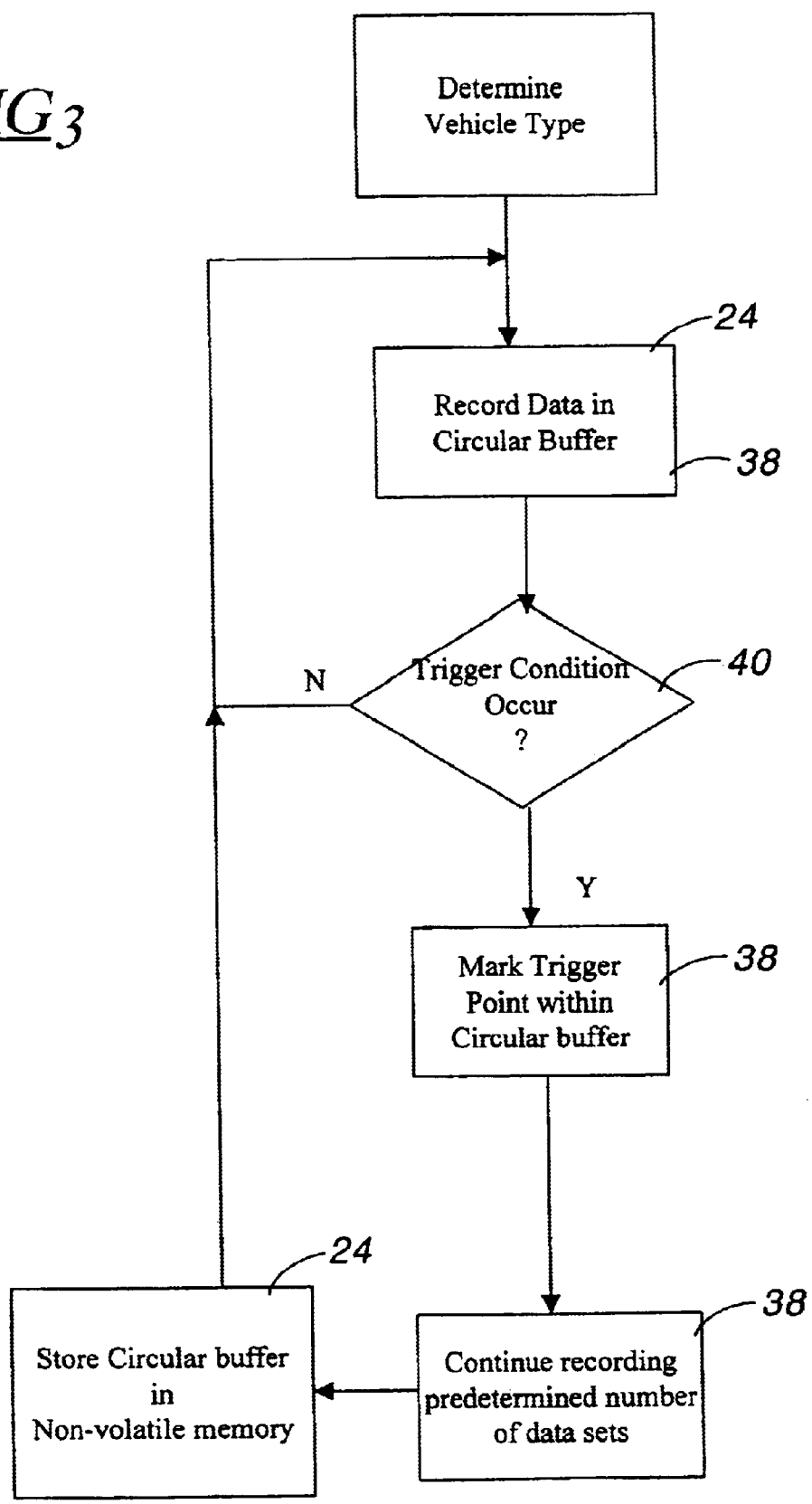

MULTI-PURPOSE PLUG-IN MONITOR FOR VEHICLES

This application claims the benefit of provisional patent application No. 60/193,157 filed Mar. 28, 2000.

BACKGROUND OF THE INVENTION

1. Field of the Invention

The present invention relates to devices for performing a variety of vehicle monitoring tasks.

2. The Prior Art

Since the mid 1990's, new passenger vehicles and most commercial vehicles have employed a mandated, in-vehicle multiplexed data communications bus to provide a means of obtaining emissions data from the electronic engine controller. Since the data communication bus was present, vehicle manufacturers exploit said bus for the purpose of distributed control and wire and connection reduction. This bus facilitates the control of virtually all features of the vehicle, from engine control, ABS systems, safety systems, and instrument panel control, to comfort features such as power seats, power windows, navigation systems and audio/video systems.

The parameters that are broadcast on the vehicle communication bus pertain to virtually all vehicle operational parameters, from vehicle speed and engine RPM, to whether a seatbelt has been fastened, but will vary between vehicle models and manufacturers. Additionally, the occurrence of data transmittal on the communication bus can be at a set frequency, or upon change. In all cases though, the time of occurrence of data transmittal is non-deterministic. The data content and variety of information is continually increasing due to the evolution of the technology, increasing bandwidth, and increasing passenger comfort features to remain and increase competitiveness.

Driver performance monitoring systems utilize costly discrete sensors, such as the system of U.S. Pat. No. 5,499,182. This embodiment utilizes a plurality of sensors and compares the sensed values to predetermined limits to determine whether the driving operations are being performed safely. Data samples are taken at a predetermined sample rate and processed, analyzed and stored for future upload to a remote computer. This invention requires a remote computer for playback of driver performance information and analysis. Therefore the driver is not provided with immediate feedback that can aid in driving improvement and training.

Many diagnostic and vehicle monitoring devices have been patented and produced, taking advantage of the capability of electronics and sensors. The nature of the diagnostic and monitoring devices known to date are expensive, cumbersome to use while driving, and typically require complex user interaction. Many of the monitoring systems employ a plurality of sensors, requiring signal conditioning, and a plurality of wires and connections. The tools utilize one or more predetermined sample rates for data acquisition. The current diagnostic techniques require that the diagnostic tool perform transmissions to the controllers attached to the vehicle communications bus for the purpose of issuing commands and querying for data. This is very useful in a service bay environment. The diagnostic tools that connect to the vehicle communications bus are targeted for use by trained mechanics and diagnosticians, and employ complicated displays and a user keyboard, or require connection to a computer to be utilized. These diagnostic tools operate on an interactive basis, requiring the user to query different control modules on a subject-by-subject basis. When diagnostics need to be done in a down-the-road condition, adverse safety conditions may exist due to interaction with the tool, the plurality of sub-units required, and the cabling inherent to this type of physical configuration.

SUMMARY OF THE INVENTION

The present invention provides a system and methods for an inexpensive, versatile, plug-in device capable of being programmed and reprogrammed to perform a variety of vehicle monitoring tasks. The system is the Plug-in Monitor. The systems are the software programs that will run within the plug-in monitor to provide functionality as selected by the end-user. This plug-in monitor will connect to a vehicle's existing under-dash communications port and be powered by the battery power available at this port. No additional components are needed to monitor the vehicle. The vehicle monitoring takes place in a completely non-intrusive manner in that the plug-in shall not perform any query or transmittal onto the vehicle data communications bus. Rather, it will be a passive monitor. No additional external sensors or signal conditioning are required. This invention also makes provisions for identifying the driver, and allowing the plug-in monitor to be used on multiple vehicles, by maintaining driver identification and also by discovering the vehicle identification via the broadcast VIN.

Prior to plugging into the vehicle diagnostic connector, the plug-in device will be programmed to perform a specific task (method) and to filter on vehicle functional messages containing parameters associated with the programmed task and store the data of interest for the selected task. Examples of plug-in functions include, but are not limited to: 1) performing down-the-road flight-recording for subsequent diagnosis of a reported problem which does not manifest during service (a "No Trouble Found" situation); 2) driver behavior monitoring, training and modification; 3) commercial fleet use logging, for miles and run vs. idle time; or 4) fuel economy improvement feedback device.

The plug-in will automatically sense the type of communications in use on the vehicle, by the pins which are carrying the data signals, and also determine the make and model of the vehicle from the broadcast Vehicle Identification Number (VIN). From this information, the plug-in will then use the appropriate set of message filters, based on make and model of vehicle, to perform the pre-programmed functionality currently residing in the plug-in.

The plug-in device can be reprogrammed to accept and process new messages as they become implemented by the vehicle manufacturer. Examples of additional messages that may be implemented in the future include, but are not limited to: 1) vehicle location messages from in-vehicle or portable navigation systems; 2) traffic status messages from Intelligent Transportation System (ITS) broadcast devices (transceivers or transponders); 3) speed limit messages from ITS broadcast devices; and 4) time-of-day messages from a radio system.

In accord with the feedback aspects of this invention, it will have a simple method of indication to the user, the purpose of which depends on the currently programmed task of the plug-in. The indication must be simple enough as to not interfere with operation of the vehicle. The indication can be a minimal number of visual indicators embedded in the device, or an audible indicator within the plug-in, or a combination of both types of indication.

An additional piece of hardware, which may or may not be needed depending on the vehicle and function for the plug-in is similar in nature to a key-fob. This key-fob like device would provide two functions. The first, for driver monitoring applications, would be to identify the driver to the plug-in. This would not be necessary for vehicles which have the driver personalization feature, where the driver's identification is broadcast on the vehicle communications bus. The second use for this remote key-fob like device would be for use in down-the-road diagnostics and troubleshooting, where the driver, upon noticing the problem indicator, such as a vibration or noise, would press a button on the remote device, signaling the plug-in that the trouble has occurred. Then the appropriate window of vehicle message data would be stored for later diagnosis.

BRIEF DESCRIPTION OF THE DRAWINGS

FIG. 3 is a flow diagram illustrating method 3.

DESCRIPTION OF THE PREFERRED EMBODIMENTS

Figure 1:
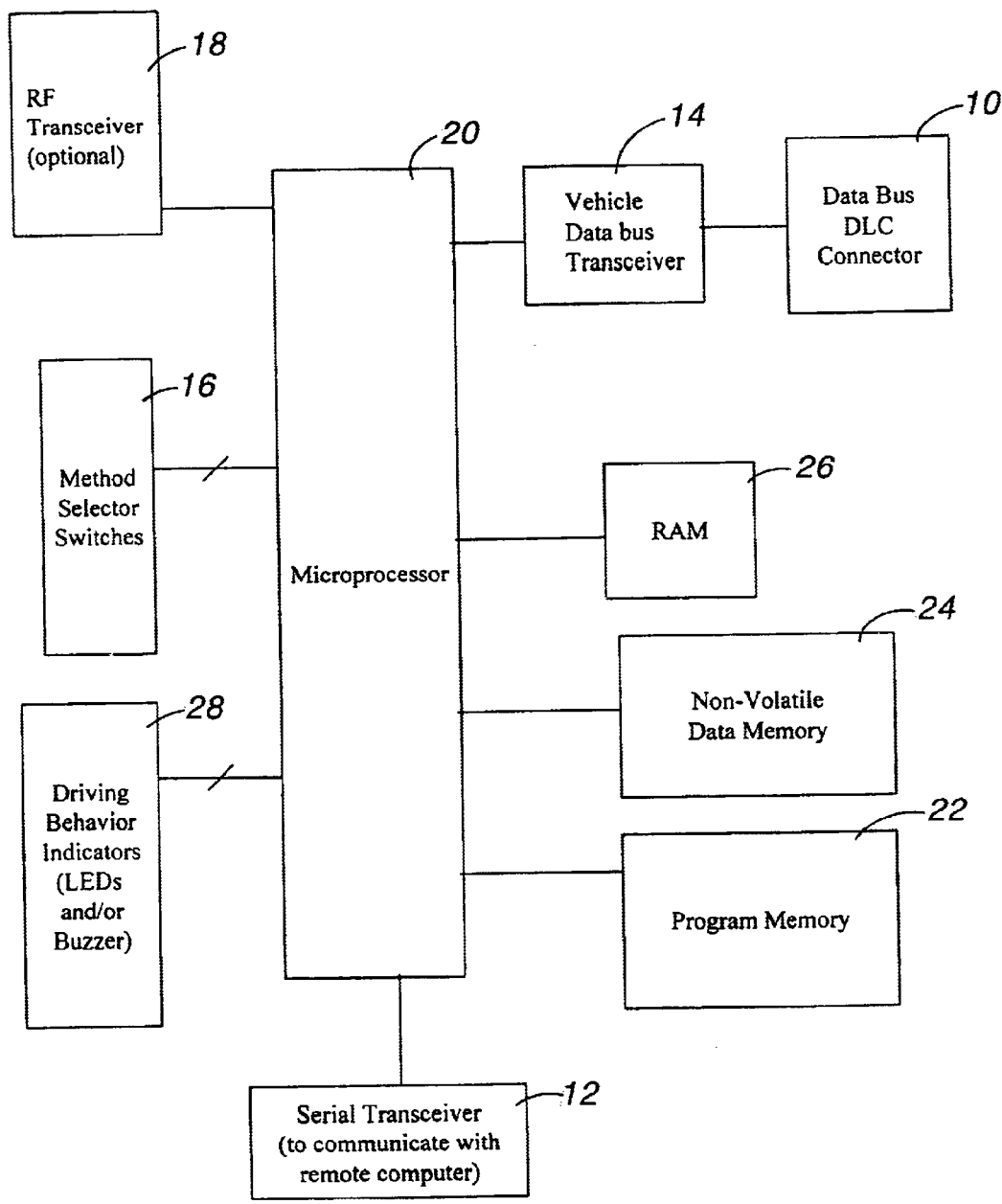
FIG. 1 is a block diagram of the monitor.

The system of the presently preferred embodiment includes an electronic monitor potted in a plug-in module. One end of the plug-in module mates with the in-vehicle communications port (DLC) connector 10. At another location on the plug-in module is a standard serial port connector and power jack for remote operation 12. This plug-in monitor system can perform a plurality of methods, some of which are described in the next section.

The in-vehicle connector will provide an interface to vehicle power and the vehicle communications bus. The plug will have the capability of conditioning the vehicle power to power appropriate to supply the plug internal components. Internally connected to the connector pins associated with the vehicle communications (the pin(s) depend on the protocol associated with particular vehicles) shall be several vehicle communications transceivers 14 which will convert the physical layer signals to digital signals which are then usable by the microcontroller and protocol controllers.

Separate from the vehicle interface plug, the serial port connector 12 provides a means for re-programming the plug-in for different applications, and for uploading the plug-in's stored data for further analysis. A bank of switches 16 can be used for selecting the application, when external re-programming is not desired.

The plug-in system, when being utilized in a vehicle that does not employ remote keyless entry with personalization, can include a second, remote fob unit 18. The purpose of this unit is twofold. First, upon actuation of the button, an RF signal will be transmitted to the plug-in, identifying the driver, much like a remote entry with driver personalization operates. The second purpose for this unit is employed in the diagnostic function and method, where the driver has noticed an anomaly while driving the vehicle and wants to initiate a flight-recording process. In a vehicle with personalized remote keyless entry, these functions can be achieved in the same way, by monitoring the vehicle communications bus.

Plug-in Monitor Internal Components

The internal components consist of a microprocessor 20 or microcontroller to provide supervisory control over re-programming, data storage, and communications appropriate to the selected function and vehicle. Refer to FIG. 1, Block Diagram. There are two functionally separate areas of non-volatile memory, embodied as flash memory. The first area is the re-programmable operational program memory area 22. The second area provides the non-volatile data storage area 24. The sizes of the two memory areas can be reconfigured depending on the specific monitoring function to be performed.

Interfacing between the microprocessor or microcontroller are a series of communications protocol controllers, with one or two controllers possibly being resident within the microcontroller 20, depending on the microcontroller chosen to implement the invention.

There will be suitable amount of volatile RAM 26 for running the functional programs and also for running the re-programming algorithm. This RAM may be resident on the chosen microcontroller, or implemented as external RAM. There is an appropriate serial transceiver 12 for proper signal conversion for implementing the communications port to the remote analysis/reprogramming system. This system could be a computer, or other protocol analyzer typically used in the automotive industry. In the future, this serial transceiver can be a cellular link for uploading data and being reprogrammed via satellite. In addition, there are driving behavior indicators 28.

In the embodiment utilizing the wireless, key-fob 18 like unit for driver identification and diagnostic triggering, the plug-in will have an RF receiver for obtaining the fob data.

Method 1

Driver Behavior Monitoring, Training and Improvement.

Figure 2:
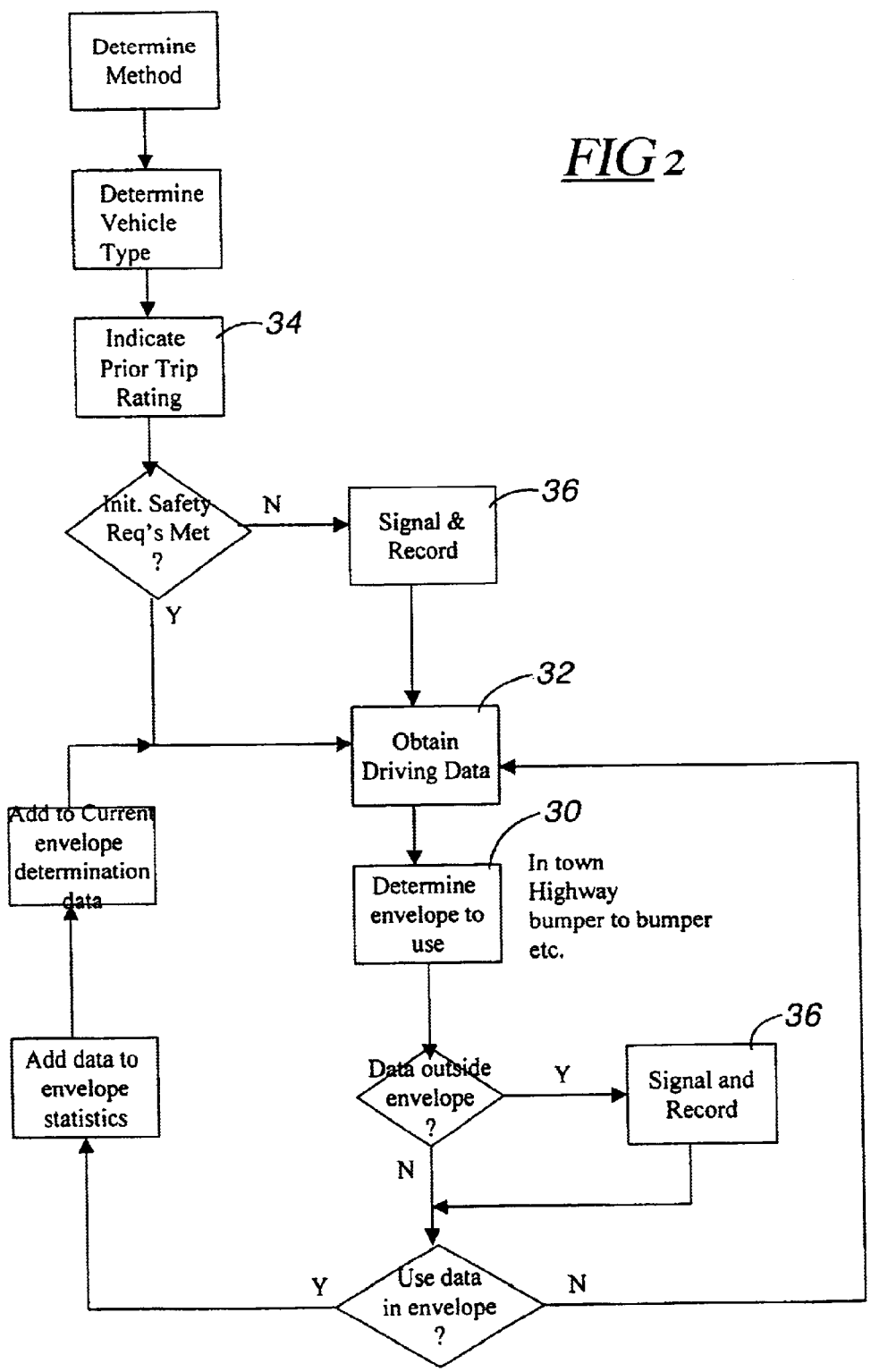
FIG. 2 is a flow diagram illustrating methods 1 and 2.

The plug-in monitor shall be programmed with the software required to perform driver behavior modification, feedback, and analysis. The plug-in monitor will then be plugged into the vehicle communications port. Refer to FIG. 2 for Methods 1 and 2.

The first is to provide real-time monitoring of pre-established parameters 30 and determine if the parameters are within or outside of acceptable windows. Peak speed values can be determined, along with maximum acceleration and deceleration rates 32. Other data that indicate safe driving behavior can be monitored 32. These data include but are not limited to seat belt usage, turn signal usage, speeds and accelerations, fuel economy and drive time.

For the purpose of driver training and monitoring, the plug-in device shall perform three main functions. The first function of the plug-in is to provide immediate indication to the driver that high-risk behavior is occurring. This can be done through any non-obtrusive indication such as lamps, or an audible indication 28.

The second function is to modify driver behavior and reduce high-risk operations. Since the high-risk driver will know that critical parameters are being monitored by authority figures, driver behavior should tend more toward low-risk behavior. The authority figure can be a parent, police, or insurance company. In the case of a parent, the prior driver's behavior will be reported to the parent upon key-in ignition 34, or changing power modes to a RUN state. Prior driving behavior can be generally indicated by strobing 36 the indicators on the plug-in module at a frequency proportionally indicative of the prior driver's behavior for a short period.

The driver behavior can be analyzed by uploading the data from the plug-in via any conventional method of data transfer. Examples of how this will be accomplished are: 1) to remove the plug-in from the vehicle and upload the data to a computer for analysis, archiving, or transmission to a regulatory body; or 2) upload the data to a data base via a satellite link, currently being used on newer passenger vehicles and commercial trucks.

There is currently no established profile for safe driving parameters. Speed limits vary from location to location, state-to-state. Normal driving parameters will differ based on the area, rural vs. urban vs. suburban. Therefore, it is desirable to use something other than pre-programmed limits such as prior art employs. This invention's method proposes to utilize learned behavior, comparing current parameters to maximums, minimums, and averages of the historical data. Trends will be sensed that will be judged to fall outside of the normal behavior indicators for the vehicle in which the plug-in monitor is currently installed. The learned behavior parameters will be more indicative of standard operation within the spatial vicinity for which the vehicle is being operated. Parameters will continuously be compared to the historically pre-established limits and averages. When the current parameters fall outside the historical values, indication will be provided to the driver. Establishing the history, or learning acceptable driving behavior can then take into account normal driving phenomena which may, with other systems be interpreted as driving performance faults. Examples of occurrences which are normal in some areas, but not normal in others are: 1) merging onto freeways, where rapid acceleration is required; 2) frequent stopping and starting vs. long periods of highway driving; 3) highway driving in Ohio with a speed limit of 65 MPH vs. highway driving in some western states with speed limits exceeding 70 MPH. Some technology experts refer to this method as a neural or fuzzy process.

Eventually, the Intelligent Transportation System initiative may provide transponder type equipment on the nations highways to provide information to passing vehicles. The proposed information will include traffic problem information, posted speed limits, and current average vehicle speeds, for instance. When this information becomes available to vehicles, the information received will be broadcast over the vehicle communications bus and be able to be monitored and utilized by the plug-in monitor.

Method 2
Establishing Safe Driver Profiles The plug-in monitor will be programmed to perform a combination of method 1 and method 3. A plurality of plug-in monitors will be installed on a large enough population of vehicles to provide good statistical samples.

This plug-in monitor can be used as a data gathering tool for entities concerned with establishing safe driver profiles for various regions. The plug-in monitor will then perform and combination of method 1 and method 3 to provide the most complete set of data possible to a remote computer or database which will then perform analysis using all data from a plurality of plug-in monitors and drivers. Then a generic safe driver profile can be developed for interested industries, such as the trucking industry, insurance industry and regulating bodies like law enforcement and DOT.

Method 3
Diagnostic Flight Recorder

The Plug-in Monitor will be programmed to function as a flight recorder and then plugged in to the vehicle communications port. Refer to FIG. 3. All data shall be stored with a relative time stamp in a large circular buffer 38 within the data storage flash memory area 24. When the driver observes the anomaly, the remote fob button shall be pushed 40. This triggers the plug-in monitor to create a window of data captured both before and after the button push. Therefore some historical data which occurred prior to the anomaly observation is captured for analysis, as well as data occurring after the start of the anomaly. The plug-in monitor will provide indication to the driver that flight-recording has started, either visually with LEDs or audibly 28. At the end of the data gathering session, another indicator will be asserted to inform the driver that the recording is complete. The driver will be able to perform multiple recordings, typically when the anomaly is observed again, so that a complete set of data can be gathered for analysis. The plug-in monitor can then be removed and plugged into an analysis device, typically a service shop computer for in-depth analysis and diagnosis of the problem.

Method 4
Fleet/Commercial Vehicle Use Monitor

The Plug-in Monitor will be programmed to be a use and idle time monitor. The plug-in monitor would be installed in the vehicle and the operator of the vehicle would be identified by operating the button on the remote fob communicating with the RF transceiver 18 shown in the block diagram of FIG. 1. Use parameters would be maintained, per vehicle and driver. The use parameters would include ON time, IDLE time, miles driven, and other items of interest which would be user selectable at programming time. Another pre-programmed parameter will be maximum operating hours allowed. Using this information, the plug-in monitor can, with it's embedded indicator(s), indicate to the driver that a break from vehicle operation is required.

The plug-in monitor data will be periodically uploaded to a database, either by using a remote computer, or through a satellite link commonly found on today's vehicles and commercial trucks. The advantage to this use of the plug-in monitor over established methods, is that it keeps track of both vehicle and driver.

Method 5
Fuel Economy Monitor and Improvement

The plug-in monitor will be programmed to perform a fuel economy monitor, analysis and indication function. The plug-in monitor will then be installed in a vehicle. Fuel economy will be monitored by filtering on the data specific to fuel use and economy, such as speed, RPM and throttle position. Average fuel economy and instantaneous fuel economy will be maintained. When the instantaneous fuel economy exceeds the average by a pre-determined amount, the plug-in monitor will provide indication to the driver.

Additionally, fuel economy running averages, total fuel consumption and other parameters of interest can be programmed into the plug-in monitor by the end-user, and maintained and uploaded to the end-user's data base or computer.

Method 6
End-User Parameter of Interest Monitor

The plug-in monitor will be programmed by a computer to monitor and maintain a set of parameters as available on the vehicle communications bus and as of interest to the end-user. The data monitored and maintained by the plug-in will be uploaded to the end-user's computer in a format that can be accepted and manipulated by a commercially available software package such as Excel or Access or Word. This will provide the owner of any vehicle with the ability to not only own the data generated by said owned vehicle but maintain data for analysis, possibly improving economy, quality of life, and safety.

What is claimed is:

1. A method for troubleshooting intermittent or "No trouble found" problems while driving down the road that does not require a service technician, the method comprising:

using a vehicle's remote key-fob or plug-in monitor system fob for indicating when to establish a trigger point for flight recording, capturing a window of data from both before and after the vehicle driver triggers flight recording, indication to the driver that flight recording has begun, and also when it has ended, capturing subsequent windows of data from both before and after the vehicle driver subsequently triggers flight recording, and the ability to upload all recorded instances of anomaly flight recordings for further analysis in a service bay environment.

2. A Plug-in monitor system comprised of:

a first connector that mates to a vehicle diagnostic communications port connector located within a cab of a passenger or commercial vehicle that provides electrical power and the ability to monitor data transmitted on the vehicle data communications bus, a second connector that mates to a remote machine to allow for bi-directional transmission for the purpose of programming the plug-in monitor to perform a plurality of functions and to accept data from the plug-in monitor, a power jack for powering the plug-in monitor while being programmed or uploading data remote from the vehicle, a microcontroller based circuitry to perform a set of operations programmed into non-volatile, electrically modifiable program memory, a radio frequency receiver to accept driver identification and triggering information and provide this information to the microcontroller, a bank of non-volatile, flash memory for operational or program code, a bank of non-volatile, flash memory for monitored data storage, and at least one vehicle communications protocol transceiver and protocol controller that interfaces with the microcontroller for retrieving data from the vehicle communications bus.

3. A method for monitoring, training and improving driver behavior which is based on a fuzzy logic, or learning process, using historical, and ongoing data to establish and maintain safe driving parameters, the method including three approaches to improving driver behavior comprising:

immediate indication to the driver when data associated with safe driving falls outside a maintained safe driving parameter's envelope, uploading a driving parameter history to a computer or data base for further analysis and plotting, and providing proportional indication on prior driver's safe driving behavior upon Ingition-ON occurrence using indicators on a plug-in module.

4. A method to allow an end-user of a plug-in to customize the plug-in monitor, comprising an interface to the plug-in monitor through a supervisory system, including a personal computer and software running on the supervisory system, the end-user having the ability to select any available parameters for monitoring and storage, after the plug-in monitor is programmed by the end-user, installed in a vehicle, and operated as a custom parameter monitor, the monitored data being uploadable to the supervisory system for end-user analysis.

* * * * *